United States Patent [19]

Burston et al.

[11] 4,324,524
[45] Apr. 13, 1982

[54] DUST RETENTION DEVICE

[75] Inventors: Jonathan D. Burston, Dalkeith; Robert G. Henley, Bickley, both of Australia

[73] Assignee: Barrett Burston (Australia) Limited, Melbourne, Australia

[21] Appl. No.: 117,306

[22] Filed: Jan. 31, 1980

[30] Foreign Application Priority Data

Feb. 12, 1979 [AU] Australia ............................. PD7654

[51] Int. Cl.³ ........................ B65G 3/04; B65G 65/32
[52] U.S. Cl. .................................... 414/291; 141/239
[58] Field of Search ....................... 414/291, 292, 293; 193/32, 31 R, 31 A; 251/121, 122; 137/599; 160/184, 186; 141/239, 286, 359

[56] References Cited

U.S. PATENT DOCUMENTS 1,897,599  2/1933  Young ................................. 414/293
2,865,260 12/1958  Lee ...................................... 137/599
3,417,881 12/1968  Loveless ............................. 193/32

FOREIGN PATENT DOCUMENTS 2700285  5/1977  Fed. Rep. of Germany ...... 414/293
 399481  6/1909  France ................................ 414/293

*Primary Examiner*—Lawrence J. Oresky
*Attorney, Agent, or Firm*—Murray and Whisenhunt

[57] ABSTRACT

The device is for retaining dust when particulate material is dumped through the device into a container. The device has a plurality of adjacent inverted-V shaped restrictors which swing about an axis along the point where the two leaves of the V meet. There are material deflectors which unevenly load some of the restrictors.

7 Claims, 8 Drawing Figures

DUST RETENTION DEVICE

FIELD OF THE INVENTION

This invention relates to a dust retention device.

The dust retention device of this invention has particular application to tracksinks, dumpsinks, hoppers, chutes and other things which are intended to convey, receive or contain particulate materials.

BACKGROUND TO THE INVENTION

The handling of particulate material often creates dust and this dust can be difficult to retain or collect. This problem of dust arising from handling of particulate material is particularly acute in the case of dumpsinks, hoppers and chutes and particularly so in the case where there is a large open surface area as dust extraction is expensive as large volumes of dust laden gas must be handled.

SUMMARY OF THE INVENTION

The present invention provides a dust retention device for a passage to a container for particulate material, the dust retention means comprising a plurality of openings, a restrictor for each such opening so mounted as to normally restrict the respective opening and wherein each restrictor is such that when loaded by particulate material in excess of a predetermined amount it will move independently of the other restrictors to open the respective opening and dump the material thereon and thereafter return to restrict the respective opening while the other restrictors not so loaded remain in restricting condition to restrict egress of dust through their respective said openings.

PREFERRED ASPECTS OF THE INVENTION

The number of such openings and such restrictors is not of itself critical but it is to be noted that if there was only one opening and restrictor then the device would be no more effective than a door or like structure which, when closed, would restrict escape of dust but which, when open, would not restrict escape of dust. Further, the present invention has most merit in a situation in which some of the restrictors are in the open position but some of the restrictors are in the restricting position in that the restrictors in the open position let particulate material pass but those in the restricting position are restricting the escape of dust. Thus it is the restrictors in the restricting position, rather than those in the open position, which are primarily providing advantages.

Accordingly, it will be realized that, as a generalization, the more of such openings and such restrictors the better; of course, economic and size considerations will place an upper limit to the number.

Preferably there are at least 6 such openings and restrictors although considerably more is preferred.

Still further, since it is the restrictors which are in the restricting position which are providing benefit it is to be appreciated that the present invention has particular application in the case in which the cross-sectional area of said passage is large with respect to the amount of particulate material to be passed therethrough in any one operation as less of the restrictors will move to the open position and more will remain in the restricting position. In the last respect, the area over which the particulate material is distributed over the device in any one operation will also have an effect. The concept of a large cross-sectional area of said passage must be understood in the context of the particulate material in question. For instance, in dealing with certain powders, one square meter of cross-sectional passage area may be considered large whereas when dealing with kilotonne quantities of grain bulk storage anything less than 100 square meters of cross-sectional passage area is unlikely to be considered large.

Preferably each such restrictor comprises a flap mounted to move between the restricted and open position and bias means adapted to bias each flap towards the restricting position.

The bias means may be a spring or counterweight.

However, the use of springs and counterweights on flaps is not preferred and at the present time it is more preferred that each such restrictor comprises a shutter extending across the respective opening, each shutter comprising a central axis about which it is pivotally mounted and a leaf extending to each side thereof, the arrangement being such that unequal loading of the leaves will cause each shutter to move and dump and thereafter return as aforesaid.

Preferably each leaf of each shutter extends outwardly and downwardly from the respective central axis.

Since it might be possible for particulate material to initially substantially evenly load one or more of the shutters and/or that particulate material could bridge over a number of the shutters it is preferred that directing means is provided to direct falling particulate material to unequally load one leaf with respect to the other leaf of selected ones of the shutters.

In one instance of this a plurality of such shutters are parallel one to the other and said directing means is provided to unequally load one leaf of from every shutter to each tenth shutter preferably from each one to fifth shutter.

However, in a more preferred instance said directing means is provided by a plurality of baffles of inverted V-shape cross-section, wherein a plurality of such shutters are parallel, wherein each baffle is located to restrict loading of adjacent leaves of adjacent shutters and wherein from zero to not more than nine preferably from zero to four, shutters not associated with such baffles are located in between sets of adjacent shutters associated with such baffles.

Preferably said adjacent shutters are so spaced that said adjacent leaves cannot touch when said adjacent shutters pivot.

The shutters need not be so close to one another that they seal and indeed this is not preferred for a number of practical considerations including that of allowing individual particles to trickle through gaps between the shutters.

The device of the present invention lends itself to modular construction. For instance in one instance a module of the device comprises a frame, from two to ten inverted, V-shape cross-section, parallel shutters pivotally mounted at the apices and a selected number of such baffles. Such modules may be assembled side-by-side and/or end-to-end to make a device in accordance with this invention of the size required.

Specific constructions of devices in accordance with this invention will now be described with the aid of the accompanying drawings.

Figure 1:
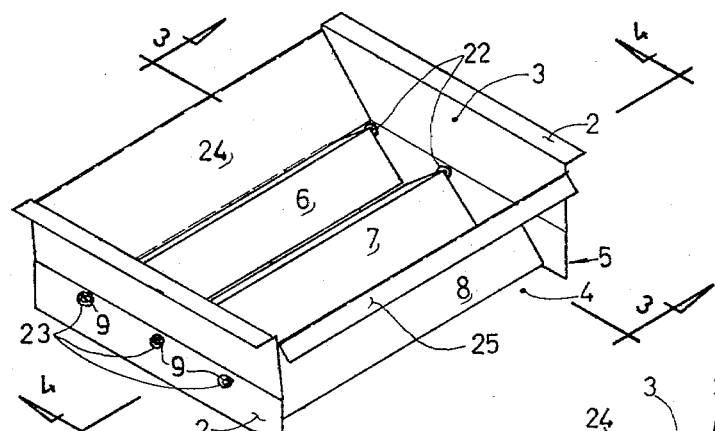
FIG. 1 is a perspective view of a module.
Figure 3:
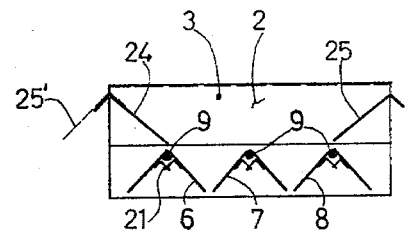
FIG. 3 is a cross-section on lines 3—3 in FIGS. 1 and 2.
Figure 2:
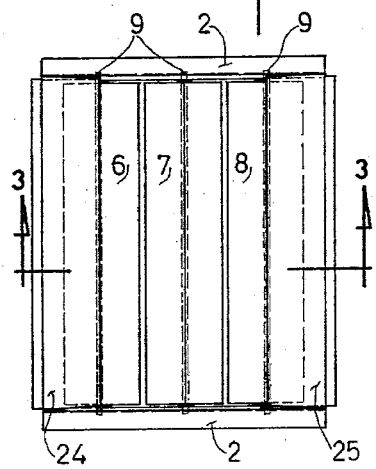
FIG. 2 is a plan view of the module.
Figure 4:
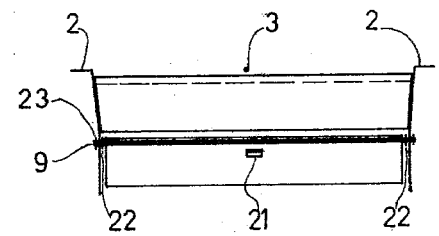
FIG. 4 is a cross-section on lines 4—4 in FIGS. 1 and 2.

The module shown in FIGS. 1-4, comprises an outer casing 5 comprising walls 2 and which is open at its top 3 and bottom 4.

Within the casing 5 are three V-shaped shutters 6, 7 and 8. The shutters 6-8 are mounted with the V-shape inverted and are pivotally mounted by means of rods 9 which pass into the walls 2 of the casing 5. The shutters 6-8 are held to the rods 9 by plates 21 which are welded to the shutters. The rods 9 carry washers 22 and nuts 23.

The module of FIGS. 1-4 further includes two baffles 24 and 25 of inverted V-shape but with one leg longer than the other. When two such modules are placed side-by-side with the shorter leg of one baffle of one overlapping the longer leg of one baffle of the other a generally equal length legged baffle will result; this last is generally shown by a dotted line 25' in FIG. 3.

In use, a plurality of such modules will be placed side-by-side and end-to-end to make up a dust retaining device.

Figure 6:
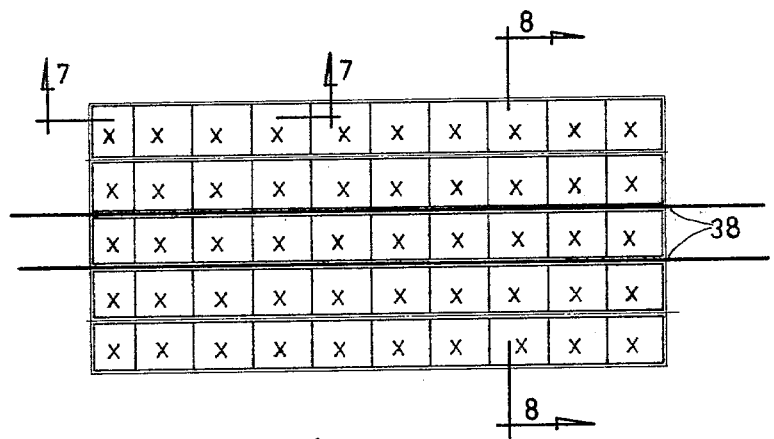
FIG. 6 is a top plan view of a grain hopper but with a grille removed.
Figure 7:
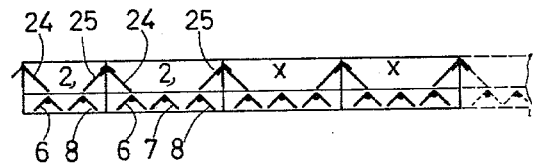
FIG. 7 is a cross-section through the grain hopper on line 7—7 in FIG. 6.
Figure 8:
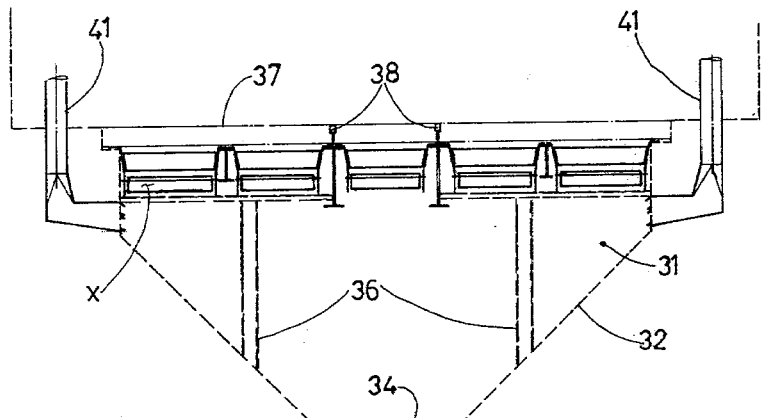
FIG. 8 is a cross-section through the grain hopper on line 8—8 in FIG. 6.

One instance of the use of a plurality of such modules is the hopper or dumpsink shown in FIGS. 6 to 8.

The hopper, 31, comprises sides 32, a bottom 34 which may discharge to a silo, supports 36 for a removable grille floor 37 and for a railway track 38 and for a plurality of the modules of FIGS. 1-4 which are indicated generally in FIG. 6 and individually in FIG. 7 by "X".

In one specific instance the hopper was 6 meters wide and 18 meters long.

In use, railway trucks are run onto the track 38 and the trucks are then tipped or opened to discharge material which falls through the grille floor 37 onto the modules X. Those of the shutters 6-8 which are unevenly loaded with grain will pivot to dump material. Further, the baffles 24 and 25 ensure that the shutters 6 and 8 are unevenly loaded. Thus, unevenly loaded shutters 6 and 8 will immediately or eventually dump the material on them. This will also cause intermediate evenly loaded shutters to become unevenly loaded and to tip and discharge. Those shutters which have not been loaded will not move and dust escape past them will be limited.

If desired, dust extraction means 41 may be provided and need not be so large as if the modules X were not used. In this last respect, allowing gaps at the ends of the shutters 6-8, at the ends of the legs of the shutters 6-8 and between the baffles 24 and 25 and shutters 6 and 8 should result in the plan area of the hopper being at least 90% closed when no shutter 6-8 is pivotted and results in a smaller fan being needed. Further, since it is unlikely that more than 25% of the shutters 6-8 will be open at any one time this also reduces the need to have a large fan. In this last respect if dust extraction is required the volume of gas handled by dust extraction means may be 15% of the recommended volume required without a device in accordance with this invention.

It is to be noted that the angles made with the vertical by the legs of the shutters 6-8 and by the baffles 24 and 25 are preferably greater than the angle of repose of the material being handled.

Figure 5:
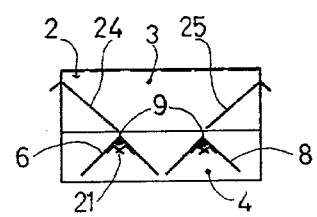
FIG. 5 is a cross-section similar to FIG. 3 but of a different module.

The module shown in FIG. 5 is similar to that of FIGS. 1-4 excepting that shutter 7 has been omitted and the size has been correspondingly altered.

The claims form part of the disclosure of this specification.

Modifications and adaptations may be made to the above described without departing from the spirit and scope of this invention which includes every novel feature and combination of features disclosed herein.

We claim:

1. A dust retention device for a passage to a container for particulate material, the dust retention means comprising
a plurality of openings,
a restrictor for each opening being mounted in close proximity to one another so as to normally restrict the respective opening,
and wherein each restrictor comprises an inverted V-shape cross-section shutter extending across the respective opening, each shutter comprising a central axis about which it is pivotally mounted and a leaf being an arm of the V-shape extending to each side thereof; the arrangement being such that unequal loading of the leaves will cause each restrictor to move when loaded by particulate material in excess of a predetermined amount independently of the other restrictors to open the respective opening and dump the material thereon and thereafter return to restrict the respective opening while the other restrictors not so loaded remain in restricting condition to restrict egress of dust through their respective said openings, wherein fixed directing means mounted above the shutters is provided to direct falling particulate material to unequally load one leaf with respect to the other leaf of selected shutters.

2. Dust retention means as claimed in claim 1, wherein there are at least 6 such openings each with a respective such restrictor.

3. Dust retention means as claimed in claim 1, wherein each such restrictor comprises a flap mounted to move between the restricting and open position and bias means adapted to bias each flap towards the restricting position.

4. Dust retention means as claimed in claim 3, wherein the bias means is a spring or a counterweight.

5. Dust retention means as claimed in claim 1, wherein a plurality of such shutters are parallel one to the other and said directing means is provided to unequally load one leaf of from every shutter to each tenth shutter preferably from each one to fifth shutter.

6. Dust retention means as claimed in claim 1, wherein said directing means is provided by a plurality of baffles of inverted V-shape cross-section, wherein a plurality of such shutters are parallel, wherein each baffle is located to restrict loading of adjacent leaves of adjacent shutters and wherein zero to not more than nine, preferably from zero to four, shutters not associated with such baffles are located in between sets of adjacent shutters associated with such baffles.

7. A dust retention device for a passage to a container for particulate material, adapted for use in conjunction with the transfer of tonnage amounts of material, a dust retention means comprising a plurality of openings, a restrictor for each such opening being mounted in close proximity to one another so as to normally restrict the respective opening and wherein each restrictor comprises an inverted V-shape cross-section shutter extending across the respective opening to form a substantially closed system, each shutter comprising a central axis about which it is pivotally mounted and a leaf being an arm of the V-shape extending to each side thereof; wherein each V-shaped shutter is equipped with a bias means adapted to bias each flap toward their restricting position, wherein the bias means is a spring or a counterweight; the arrangement being such that unequal loading of the leaves will cause each restrictor to move when loaded by particulate material in excess of a predetermined amount independently of the other restrictors to open the respective opening and dump material thereon and thereafter return to restrict the respective opening while the other restrictors not so loaded remain in restricting condition to restrict egress of dust through their respective said openings, wherein fixed directing means mounted above the shutters is provided to direct falling particulate material to unequally load one leaf with respect to the other leaf of selected shutters.

* * * * *